C. L. JAEGER.
RECORDING DEVICE.
APPLICATION FILED JUNE 28, 1909.

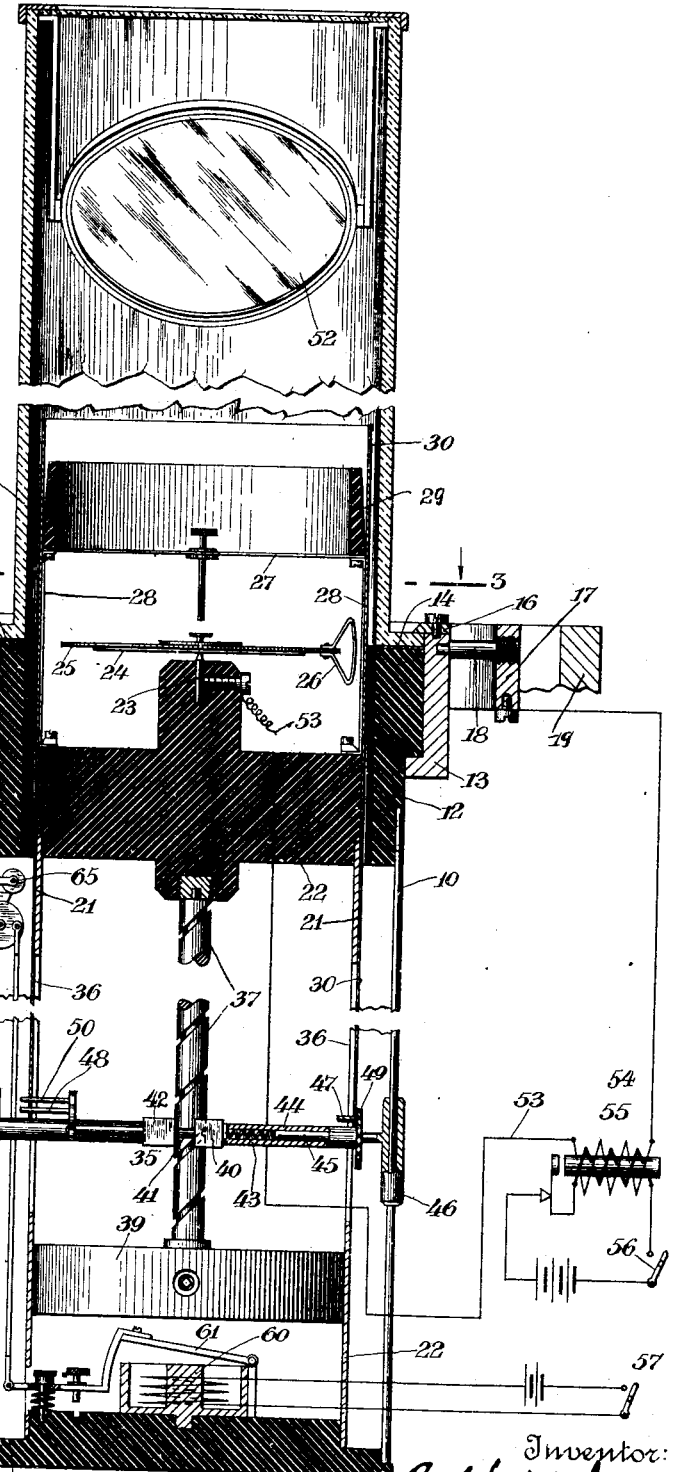

955,167.

Patented Apr. 19, 1910.
2 SHEETS—SHEET 2.

Witnesses:
John E. Prager
C. J. Fletcher

Carl Ludwig Jaeger, Inventor
By his Attorney

UNITED STATES PATENT OFFICE.

CARL LUDWIG JAEGER, OF MAHWAH, NEW JERSEY.

RECORDING DEVICE.

955,167.       Specification of Letters Patent.     Patented Apr. 19, 1910.

Application filed June 28, 1909. Serial No. 504,885.

*To all whom it may concern:*

Be it known that I, CARL LUDWIG JAEGER, a citizen of the United States, and a resident of Mahwah, in the county of Bergen and State of New Jersey, have invented certain new and useful Improvements in Recording Devices, of which the following is a specification.

My invention relates to recording devices; and particularly to devices of this character in which one of the elements is extremely sensitive, being operated by only a very weak force so that it cannot be employed to directly make a record upon a chart, an electric spark being employed for this purpose.

It has for its object to avoid disturbing the delicately supported member of such apparatus when removing the record chart; also, to render said member extremely sensitive by not requiring it to carry any appreciable weight.

It has for its further object to permit of a record being made upon a flat chart applied in cylindrical form, the full 360 degrees being utilized, whereby a more accurate record is obtained without appreciably increasing the size of the apparatus.

The invention is particularly adapted to the recording of the movements of a compass, as in recording the course of a ship. I do not wish, however, to restrict myself to this particular application as my invention can be utilized to record the movements of almost any moving part no matter how delicate, or how small the force actuating the same.

The nature of my invention will be best understood in connection with the accompanying drawings, in which—

Figure 3:
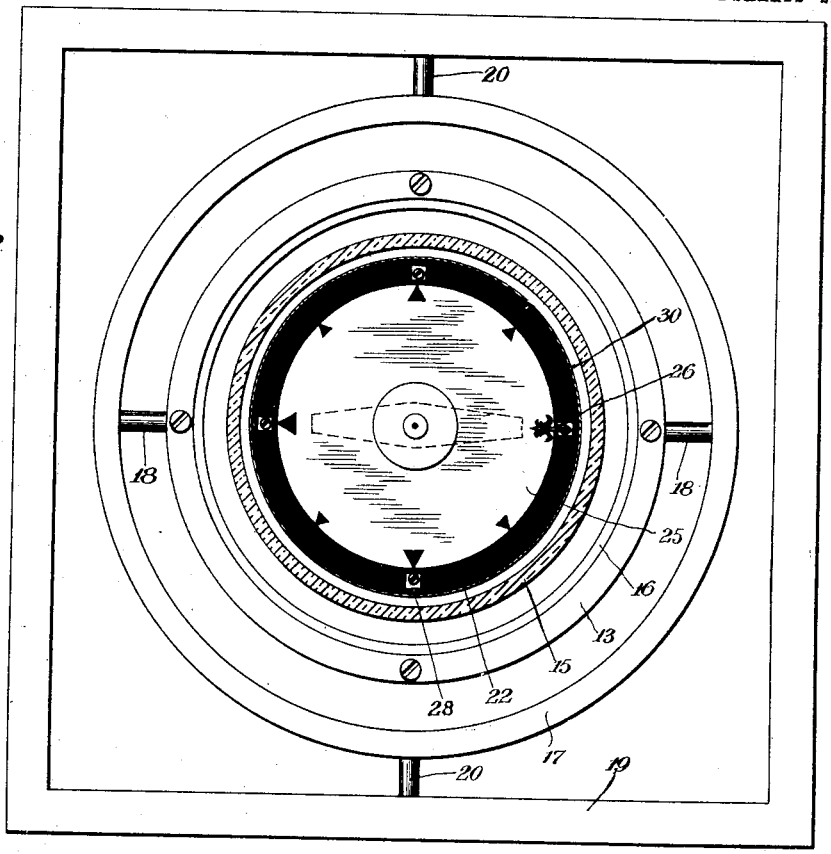
Figure 4:
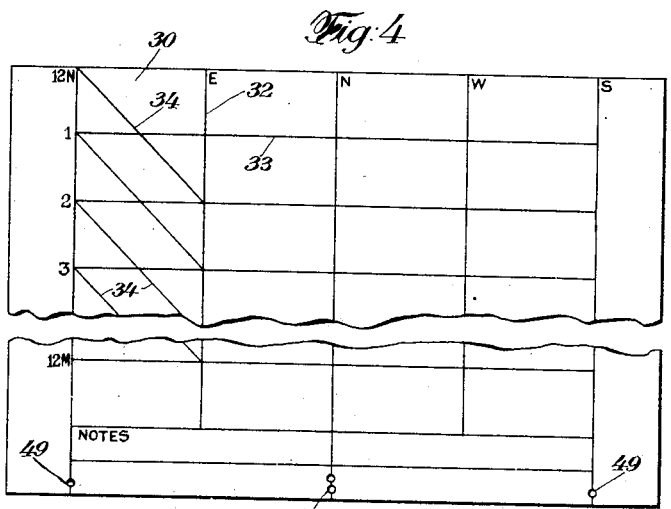

Figure 1 is a vertical section showing my invention applied to the recording of the movements of a compass. Fig. 2 is a plan view of the cross-head and guides of the chart advancing mechanism. Fig. 3 is a section on the line 3—3, Fig. 1, looking in the direction of the arrow. Fig. 4 is a view of one form of chart which may be used in connection with the apparatus.

Similar characters of reference designate corresponding parts throughout the several views.

Referring now to the drawings, 10 designates suitable guide and supporting rods mounted upon a base 11 of insulating material. To their upper end is secured a ring 12 of insulating material surrounded by a metal ring 13. The ring 12 supports an annular conductor 14 and a glass cylinder 15, the latter being held in place by a ring 16 secured to the ring 13. This glass cylinder may be omitted if desired, or may be replaced by a metallic cylinder. A gimbal ring 17 carries the ring 13, and thereby the contained mechanism, through pins 18; and is in turn pivotally secured to an outer casing or box 19 by means of pins 20.

Included by the rods 10 is a cylinder 21, its lower end being supported by the base 11 and its upper end carrying a block of insulating material 22 which contains the pivot 23 upon which is mounted one of the recording elements, as for example, the compass needle 24. The needle 24 is mounted so as to be in substantially the same plane as the annular conductor 14 and carries, in the example of a recording compass, preferably the usual compass card 25. It is provided with an extension 26, preferably arc-shaped, secured to said card 25 but in electrical communication with the needle 24. This arc-shaped extension allows for the dipping of the needle, as well as lessening the air gap between one of the ends of the member 24 and the annular conductor 14. A suitable transparent cover 27 may be fitted over this needle, being supported on supports 28 secured to the block 22; and at its top, is provided with a guiding and protecting ring 29 of insulating material.

Between the rods 10 and cylinder 21 is inserted a suitable paper chart 30 shown in detail in Fig. 4, and adapted to be advanced as hereinafter set forth. The chart 30 is provided with suitable divisions, the ordinates 32 corresponding to direction, and the abscissæ 33 to time. The diagonal lines 34 are merely transfer lines to indicate the proper time at which certain signals are made and recorded upon the chart, as will hereinafter be set forth. The said chart may be advanced by any suitable means; and I have shown it advanced by means of a separable cross-head 35 suitably guided on two of the rods 10, diametrically opposed, suitable slots 36, of course, being provided in the wall of cylinder 21. The cross-head 35 is advanced by means of a vertical rotating shaft 37 provided with threads of the desired pitch, engaged by a pin 38 of the cross-head 35. This shaft is driven by a clock movement 39, or by any other suitable means.

The cross-head is made separable, one portion 40 by means of guide rods 41 sliding through the other portion 42, said parts being normally held to each other (to shaft 37) through the action of a spring 43. Spring 43 is mounted within a tubular extension 44 of the portion 40, and acts against a rod 45 fitting within said extension and projecting inwardly from the guide 46. A pin 47 projects inwardly from the portion 40, and two pins 48 project outwardly from the portion 42. The pins fit respectively corresponding perforations 49 and 50 of the chart 30, holding thereby the said chart in position and through the upward movement of the cross-head, advancing the same.

To remove or insert a chart, the portion 40 is drawn away from the portion 42 in opposition to spring 43, thereby removing both pins 47 and 48. The same operation is necessary to manually advance the cross-head to any particular position, the pin 38 thereby being drawn out of engagement with the thread of shaft 37. As the chart in moving upwardly will necessarily obscure the view of the compass card except directly above the same, I prefer to provide a mirror 52 which may be secured to the glass cylinder 15 and set at an angle of about 45 degrees so as to reflect the compass card into view.

The needle 24 and extension 26 are in electrical connection through a conductor 53, and the annular conductor 14 through a conductor 54, with the secondary of a spark coil 55. Coil 55 is operated to cause a spark to jump between the said radial conductor and the annular conductor 14 by closing a switch 56, or in any other suitable manner. As a spark jumps between the two conductors, it will puncture the intervening paper chart 30 and thereby make a record thereon, depending on the position of the needle 24 with respect to the said chart 30 which turns relatively thereto with the movement of the vessel or other movable support. Of course, the conditions may be reversed, the needle being rotated by some external influence. I have also provided means whereby the time at which certain operations take place may be recorded, such for example as the blowing of a whistle, or other operations, or various signals; or, whereby a record of the speed of the engines of the ship may be obtained. For this purpose an electro-magnet 60 (iron-clad to avoid disturbing the compass needle) is provided, and the circuit closed through any of the agencies mentioned (but not shown) at a switch 57. The magnet 60 is screwed into the base 11 and is arranged to attract an armature 61 operating a system of levers to oscillate a rotatable plate 62 pivotally secured to a frame piece 63 secured to the ring 12. The plate 62 carries a suitable type 64, coöperating with an inking roller 65 carried by the frame piece 63, and adapted when the electromagnet is energized to make an impression upon the record chart 30. As this impression is necessarily made at some distance below the corresponding time line, the diagonal transfer lines 34 previously referred to are employed to indicate the proper time.

I claim:—

1. In a recording device: a radial conductor, and an annular conductor in substantially the same plane as said radial conductor and surrounding the same, one of said conductors being relatively fixed with respect to the other; a cylindrical record sheet between said conductors; means to advance the same; and means to cause electric sparks to pass between said conductors.

2. In a recording device: a radial conductor; an annular conductor in substantially the same plane as said radial conductor and relatively fixed with respect thereto, and surrounding the same; a cylindrical record sheet between said radial conductor and said annular conductor; means to advance said record sheet; and means to cause electric sparks to pass between the said radial conductor and said annular conductor.

3. In a recording device: a compass needle suitably mounted, and a compass card carried thereby; a radial conductor carried by said compass needle and card; an annular conductor in substantially the same plane as said radial conductor and relatively fixed with respect thereto, said annular conductor surrounding said compass needle and card and the said radial conductor; a cylindrical record sheet between said radial conductor and said annular conductor; means to advance said record sheet; and means to cause electric sparks to pass between the said radial conductor and said annular conductor.

4. In a recording device: a radial conductor, and an arc-shaped extension at right angles thereto; an annular conductor in substantially the same plane as said radial conductor and relatively fixed with respect thereto, and surrounding the same; a cylindrical record sheet between said radial conductor and said annular conductor; means to advance said record sheet; and means to cause electric sparks to pass between said arc-shaped extension and said annular conductor.

5. In a recording device: a compass needle suitably mounted, and a compass card carried thereby; a radial conductor carried by said compass needle and card; an annular conductor in substantially the same plane as said radial conductor and relatively fixed with respect thereto, said annular conductor surrounding said compass needle and card and the said radial conductor; a cylindrical record sheet between said radial conductor and said annular conductor; means to advance said record sheet; means to cause electric sparks to pass between the said radial conductor and the said annular conductor; and a mirror above the said compass needle and card and set at an angle of approximately 45 degrees.

6. In a recording device: a radial conductor; an annular conductor in substantially the same plane as said radial conductor and relatively fixed with respect thereto, and surrounding the same; a cylindrical record sheet between said radial conductor and said annular conductor; means to advance said record sheet; means to mark said record sheet; and means to cause electric sparks to pass between the said radial conductor and said annular conductor.

7. In a recording device: a radial conductor; an annular conductor in substantially the same plane as said radial conductor and relatively fixed with respect thereto, and surrounding the same; a cylindrical record sheet between said radial conductor and said annular conductor; means to advance said record sheet; means to cause electric sparks to pass between said radial conductor and said annular conductor; electro-magnetic means, and means to control same; and marking means to mark said record sheet and operated by said electro-magnetic means.

8. A recording compass comprising: a compass needle suitably mounted; a compass card carried thereby and a metallic, arc-shaped extension at right angles thereto; a radial conductor carried by said compass needle and card; an annular conductor in substantially the same plane as said radial conductor and relatively fixed with respect thereto, said annular conductor surrounding said compass needle and card and said radial conductor; a cylindrical record sheet between said arc-shaped extension and said annular conductor; means to advance said record sheet; means to cause electric sparks to pass between said arc-shaped extension and said annular conductor; and means to mark said record sheet.

9. A recording compass comprising: a compass needle suitably mounted; a compass card carried thereby, and a metallic, arc-shaped extension at right angles thereto; a radial conductor carried by said compass needle and card; an annular conductor in substantially the same plane as said radial conductor and relatively fixed with respect thereto, said annular conductor surrounding said compass needle and card and said radial conductor; a cylindrical record sheet between said arc-shaped extension and said annular conductor; means to advance said record sheet; means to cause an electric spark to pass between said arc-shaped extension and said annular conductor; electro-magnetic means, and means to control same; and marking means to mark said record sheet and operated by said electro-magnet means.

10. In a recording device: a cylindrical chart; and means to advance the same comprising, a separable cross-head, suitable guides for the same, a rotatable threaded shaft, a pin carried by said cross-head, means to normally hold said pin in engagement with said rotatable shaft, means to secure the said chart to the said cross-head, and means to simultaneously disengage said pin from said shaft and the said chart engaging means from said chart.

Signed at New York in the county of New York and State of New York this 21 day of June A. D. 1909.

CARL LUDWIG JAEGER.

Witnesses:
    FREDK. F. SCHUETZ,
    SALLY O. YUDIZKY.